(12) United States Patent
Zlojutro

(10) Patent No.: US 10,160,397 B1
(45) Date of Patent: Dec. 25, 2018

(54) CARGO SYSTEM WITH CONCEALABLE RACK FOR A MOTOR VEHICLE

(71) Applicant: Milorad Zlojutro, Broadview Heights, OH (US)

(72) Inventor: Milorad Zlojutro, Broadview Heights, OH (US)

(73) Assignee: Milorad Zlojutro, Broadview Heights, OH (US)

( * ) Notice: Subject to any disclaimer, the term of this patent is extended or adjusted under 35 U.S.C. 154(b) by 0 days.

(21) Appl. No.: 15/862,056

(22) Filed: Jan. 4, 2018

(51) Int. Cl.
*B60R 9/06* (2006.01)
*B60R 11/00* (2006.01)

(52) U.S. Cl.
CPC ........... *B60R 9/06* (2013.01); *B60R 2011/004* (2013.01); *B60R 2011/0082* (2013.01)

(58) Field of Classification Search
CPC ............... B60R 9/06; B60R 2011/0082; B60R 2011/004; B62D 33/02; B60P 3/40
See application file for complete search history.

(56) References Cited

U.S. PATENT DOCUMENTS

| 8,690,219 B1 * | 4/2014 | Calvert | B60P 7/15 296/3 |
| 9,487,152 B2 * | 11/2016 | Scott | B60P 3/40 |

* cited by examiner

*Primary Examiner* — D Glenn Dayoan
*Assistant Examiner* — Melissa A Black
(74) *Attorney, Agent, or Firm* — Cooper Legal Group, LLC

(57) ABSTRACT

Provided are a cargo system for supporting cargo on a vehicle, and a vehicle provided with the cargo system. The cargo system includes a plurality of racks to be arranged at different positions along a length of the vehicle comprising. The racks include a frame assembly configured to cooperate with an internal structure of the vehicle. A rack arm is adjustable relative to the frame assembly, and a coupling system couples the rack arm to the frame assembly in a plurality of different positions. The different positions include at least: (a) a recessed position relative to a body panel of the vehicle, and (b) a deployed position extending vertically above the body panel of the vehicle for supporting the cargo vertically above a portion of the vehicle. A rack support cooperates with the rack arm and is configured to support the cargo.

18 Claims, 9 Drawing Sheets

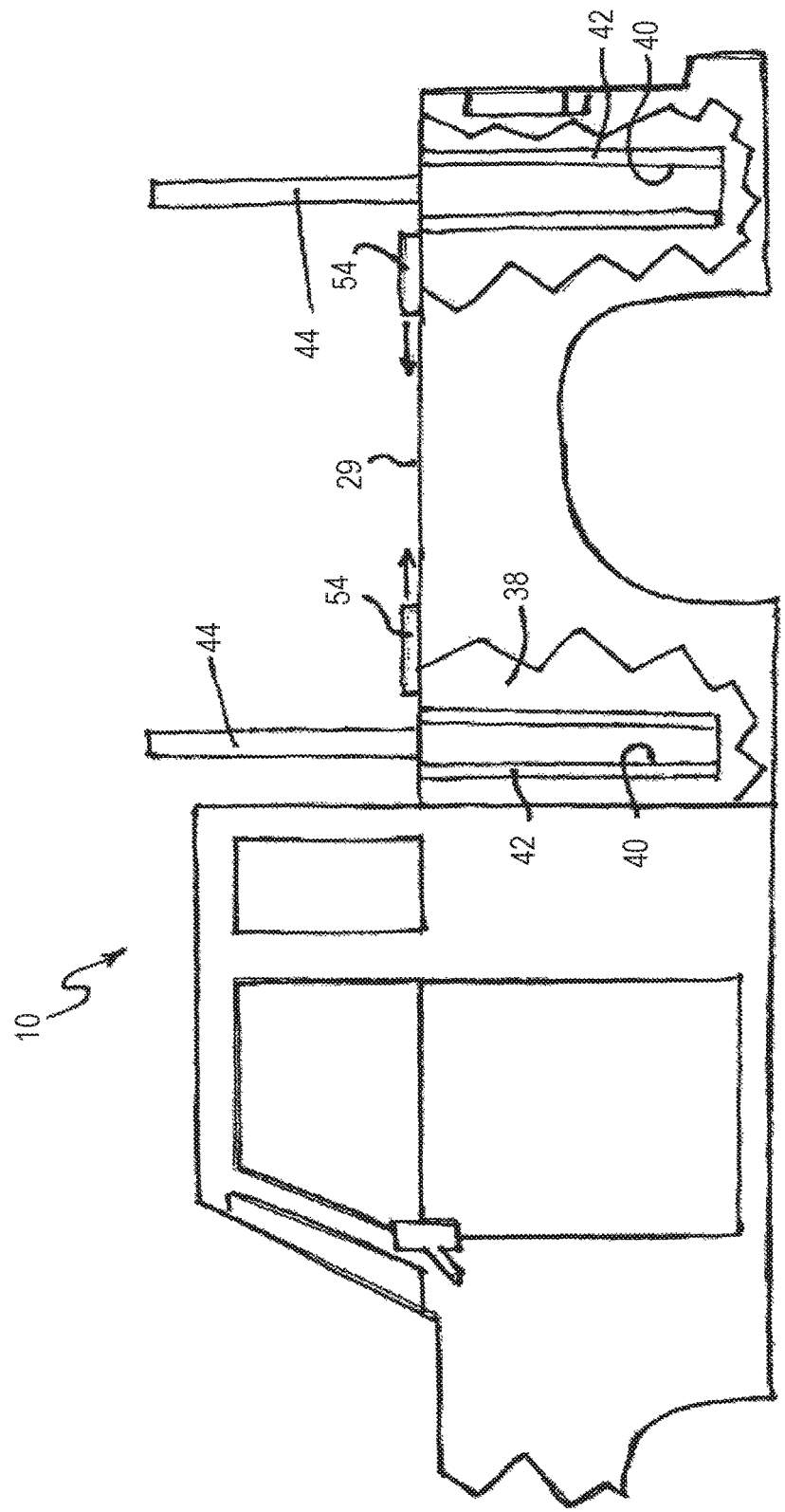

US 10,160,397 B1

CARGO SYSTEM WITH CONCEALABLE RACK FOR A MOTOR VEHICLE

BACKGROUND OF THE INVENTION

1. Field of the Invention

This application relates generally to cargo management and, more specifically, to an apparatus that is deployable from a concealed state to support cargo being transported by the motor vehicle.

2. Description of Related Art

Oversized cargo such as ladders, sheets of wood or other building materials, for example, can be conveniently transported atop a cargo rack provided to a vehicle. Conventional cargo racks for such a purpose are typically secured in a fixed position on the roof of the vehicle. The oversized cargo can be rested on the cargo rack, and optionally secured in place using ratcheting tie-down straps, for example. Although conventional cargo racks are easy to load and unload, they remain exposed on the exterior of the vehicle at all times, giving the vehicle an unsightly appearance even when they are not being used to support oversized cargo.

BRIEF SUMMARY OF THE INVENTION

According to one aspect, the subject application involves a cargo system for supporting cargo on a vehicle. The cargo system includes a plurality of racks to be arranged at different positions along a length of the vehicle comprising. The racks include a frame assembly configured to cooperate with an internal structure of the vehicle. A rack arm is adjustable relative to the frame assembly, and a coupling system couples the rack arm to the frame assembly in a plurality of different positions. The different positions include at least: (a) a recessed position relative to a body panel of the vehicle, and (b) a deployed position extending vertically above the body panel of the vehicle for supporting the cargo vertically above a portion of the vehicle. A rack support cooperates with the rack arm and is configured to support the cargo.

According to another aspect, the subject application involves a vehicle that includes a set of ground-engaging wheels, and a body formed from a plurality of body panels. The body has a length extending in a longitudinal direction parallel with a driving direction of the vehicle and a width extending transversely to the longitudinal direction. A cargo system is installed on the vehicle to support cargo. The cargo system includes at least a first rack and a second rack arranged at different positions along the length of the vehicle. The first and second racks each include a frame assembly coupled to an internal structure of the vehicle, and a rack arm adjustably coupled to the frame assembly by a coupling system. The coupling system couples the rack arm to the frame assembly in a plurality of positions, including at least: (i) a recessed position relative to at least one of the body panels of the vehicle, and (ii) a deployed position where the rack arm extends vertically above the at least one of the body panels of the vehicle for supporting the cargo vertically above a portion of the vehicle. A rack support is coupled to the rack arm and is configured to support the cargo.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF SEVERAL VIEWS OF THE DRAWING

The invention may take physical form in certain parts and arrangement of parts, embodiments of which will be described in detail in this specification and illustrated in the accompanying drawings which form a part hereof and wherein:

FIG. 5C is a side, partially cutaway view of the rear portion of the vehicle in FIG. 5A, with the mid rack and the rear rack in a deployed state;

DETAILED DESCRIPTION OF THE INVENTION

Figure 1:
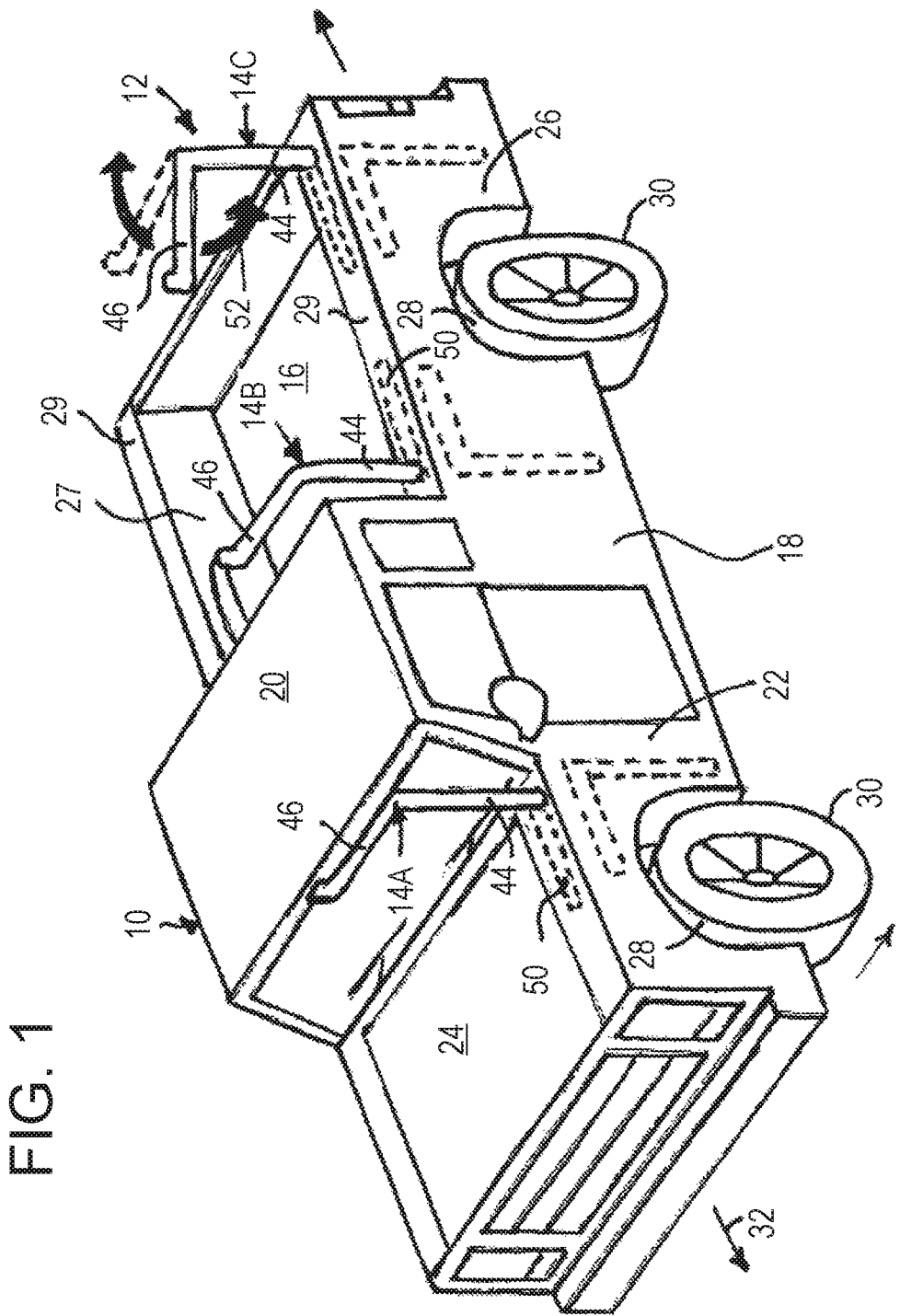
FIG. 1 is a perspective view of a vehicle equipped with an embodiment of a cargo system comprising a plurality of concealable racks.

Certain terminology is used herein for convenience only and is not to be taken as a limitation on the present invention.

Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

To transport cargo as desired and maintain an aesthetically-pleasing appearance of a vehicle, the present disclosure is directed toward a cargo system with at least one concealable rack, and a vehicle including such a cargo system. The rack, in a deployed state, includes a rack support that is supported by a rack arm and maintained at an elevation vertically above the portion of the vehicle where the cargo is to be supported while the vehicle is underway, traveling over a public roadway. When not in use, the rack can be adjusted to a stowed state, where at least a portion of the rack arm that was exposed while the rack was in the deployed state is concealed from view behind a body panel of the vehicle. A portion, or an entirety of the rack support can optionally also be concealed from view behind the same, or a different body panel of the vehicle while the rack is in the stowed state. With the one or more racks in the stowed state, the vehicle can appear to be devoid of the cargo system. Further, aerodynamic drag that would otherwise be attributed to portions of the rack being exposed to the elements while the vehicle is underway can be avoided by concealing such portions of the rack behind the body panel of the vehicle while the rack is in the stowed state.

With reference to the drawings, FIG. 1 shows a vehicle 10 equipped with an embodiment of a cargo system 12 comprising at least one, and optionally a plurality of concealable racks, referred to generally at 14 and specifically at 14A, 14B, 14C in FIG. 1. The vehicle is shown in FIG. 1 and described herein as a pickup truck such as a Ford F-150, F-250, F-350, etc.; Chevy Silverado/GMC Sierra 1500, 2500, 2500, etc.; RAM 1500, 2500, 2500, etc.; compact pickup trucks, and other such vehicles, for example. However, the present disclosure is not so limited. Instead, embodiments of the present cargo system 12 can be compatible with any vehicle other than pickup truck such as a minivan, sedan, station wagon, or any other vehicle that can be driven over public roadways to carry cargo. For the sake of brevity and to clearly describe the present cargo system 12, however, the embodiment of the vehicle 10 shown in the drawings is a pickup truck that includes a truck bed 16 arranged behind a passenger cab 18 in which a driver and optionally other occupants of the vehicle sit. The cargo system 12 is described herein as supporting cargo at an elevation vertically above a roof 20 of the passenger cab 18, but embodiments of the cargo system 12 can optionally support the cargo at an elevation that is vertically below a top of the roof 20. For example, the cargo can be supported at an elevation vertically above the truck bed 16, but below the elevation of the roof 20.

In addition to the roof 20, the body of the vehicle 10 also includes a plurality of body panels that collectively form the exterior skin of the vehicle 10. The body panels can include, for example, a front fender 22, a hood 24, a rear fender 26, sides 27 of the truck bed 16, and other body panels. Side bed caps 29 can extend between the sides 27 of the truck bed 16 and respective fenders 26 to enclose a top of an interior space 38 (FIGS. 5A-5C) between the sides 27 of the truck bed 16 and the respective fenders 26. The vehicle's body has a length extending in a longitudinal direction along an axis 32 that is generally parallel with a straight-line driving direction (e.g., when the vehicle is being driven forward, in a straight line) of the vehicle 10. The vehicle's body has a width extending along an axis 34 that extends transversely to the longitudinal direction.

The front fender 22 and the rear fender 26 each define a wheel well 28 in which at least one ground-engaging wheel 30 of a wheel set is received. At least one, and optionally a plurality of the wheels 30 is driven by a motor such as an internal combustion engine, a diesel engine, or an electric engine, for example, that is concealed from view by the hood 24, while the hood 24 is closed.

The embodiment of the cargo system 12 shown in FIG. 1 includes a plurality (e.g., three) concealable racks 14A, 14B, 14C. The forward rack 14A is arranged to support the cargo at a location forward of the passenger cab 18. The mid rack 14B is arranged to support the cargo at a location rearward of the passenger cab, adjacent to a bulkhead defining a forward wall of the truck bed 16. The rear rack 14C is arranged to support the cargo at a location rearward of the passenger cab, adjacent to a tailgate 36 defining a rear wall of the truck bed 16. The tailgate 36 can be opened and closed to selectively grant access to an interior of the truck bed 16. Although the embodiment of the cargo system 12 shown in FIG. 1 includes a plurality of concealable racks 14 arranged along a driver's side of the vehicle 10, the present disclosure is not so limited. Instead, the vehicle 10 can include one concealable rack 14. For example, the cargo system 12 can include just the forward rack 14A, just the mid rack 14B, or just the rear rack 14C, to support the cargo in conjunction with another cargo support structure such as a roof rack (not shown) installed on the roof 20 of the vehicle 10. According to alternate embodiments described below, at least one concealable rack 14 can be provided to the driver's side of the vehicle 10 and at least one concealable rack 14 can be provided to a passenger's side of the vehicle 10.

Each concealable rack 14 includes a frame assembly 40 (FIGS. 5B and 5C) configured to cooperate with an internal structure 42 of the vehicle 10. Examples of the internal structure 42 can include a structural member of the vehicle 10 that affords the vehicle 10 its functional rigidity for applications such as towing a trailer. According to alternate embodiments, the internal structure 42 can include an internal surface of a body panel, which primarily serves an aesthetic role on the vehicle 10. The frame assembly 40 can include a rail, a track, a sleeve in which at least a portion of a rack arm 44 of the rack 14 is received while the rack 14 is in the stowed state, or any other structure that can couple the rack arm 44 to the vehicle 10 in an adjustable manner. In other words, the frame assembly 40 is securely coupled to the internal structure 42 of the vehicle. The rack arm 44 is configured to cooperate with (e.g., fit within, travel along, etc.) the frame assembly to allow the rack arm 44 to be at least partially received within the body of the vehicle 10 while the rack 14 is in the stowed state, and to protrude vertically above the body of the vehicle 10 while the rack 14 is in the deployed state.

For example, the rack arm 44 shown in FIG. 1 can be a linear structure formed from a metal, metal alloy or other suitably-strong material to support the cargo loads imparted on the rack 14. The rack arm 44 can be formed from tubing having a round or oval cross-sectional shape, or can be formed from so-called square tubing having a rectangular or square cross-sectional shape. Embodiments of the rack arm 44 formed from tubing can define a hollow interior passage to afford the rack arm 44 a suitable rigidity, yet minimize the weight of the rack arm 44 to allow manual adjustment of the rack arm 44 between a recessed position and a deployed position, as described below. Other embodiments of the rack arm 44 can be formed from as a solid member.

A rack support 46 cooperates with the rack arm and is configured to support the cargo. For the embodiment shown in FIG. 1, the rack support 46 forms an approximate right angle with the rack arm 44 and extends inwardly (e.g., toward the passenger's side of the vehicle 10) from the driver's side of the vehicle 10, toward a central region of the truck bed 16 while the rack 14 is in the deployed state. A rack 14 provided to the passenger's side of the vehicle 10 can include a rack support 46 that extends inwardly (e.g., toward the driver's side of the vehicle 10) from the passenger's side of the vehicle 10, toward a central region of the truck bed 16 while the rack 14 is in the deployed state.

A coupling system 48 (FIG. 5B) couples the rack arm 44 to the frame assembly 40 so the rack arm 44 can be adjusted to a plurality of different positions relative to the frame assembly 40. As shown in FIGS. 5B the coupling system 48 includes a flange formed about a periphery of the rack arm 44, a plurality of pins protruding from the rack arm 44, or any other suitable structure that can selectively engage the frame assembly 40 at different locations. According to other embodiments, the coupling system 48 can be formed from the close proximity of opposing surfaces of the rack arm 44 and the frame assembly 40. For example, a rack arm 44 formed from round tubing can be received within a circular sleeve of the frame assembly 40. The sleeve can have an inside diameter slightly greater than the outside diameter of the rack arm 44. Such adjustment allows the rack arm 44 to be telescopically received and adjusted to different positions within the sleeve to adjust the rack 14 between the stowed state and the deployed state. One or more surfaces of the frame assembly 40 can optionally be provided with padding or another suitable sound-inhibiting material. Such a material can at least partially dissipate sounds that would otherwise occur if the rack arm 44 or another portion of the rack 14 were to vibrate against, or make contact with the portion(s) of the frame assembly 40 without the material while the vehicle 10 is underway. According to other embodiments, the rack arm 44 or other portion(s) of the rack 14 can be secured by a tether or within a sleeve while in the stowed state to at least partially mitigate noises caused by the rack arm 44 or other portion of the rack 14 vibrating or making contact with portions of the frame assembly 40 or vehicle 10. Thus, noises such as rattling by the rack caused by the road or other terrain over which the vehicle 10 is traveling can be at least partially mitigated while the rack is in the stowed state.

To deploy the rack 14 to the deployed state, the rack arm 44 is adjusted relative to the frame assembly 40 to at least partially, and optionally fully extend from the interior space 38 (FIGS. 5A-5C) in the upward direction. Fully adjusted, the rack arm 44 supports the rack support 46 at the elevation where the cargo is to be supported. With the rack arm 44 fully adjusted, the coupling system 48 can engage the frame assembly 40 and/or a portion of the vehicle 10 other than the frame assembly 40 (e.g., side bed cap 29 of the truck bed 16) and maintain the rack arm 44 at a fixed, extended position.

A locking mechanism can optionally be engaged to interfere with the ability of the rack arm 44 to be adjusted from the fixed, extended position.

To adjust the rack from the deployed state to the stowed state, an optional locking mechanism can be disengaged to permit adjustment of the coupling system to release the rack arm 44, or at least adjustment of the rack arm 44 relative to the frame assembly 40. For the embodiment of FIG. 1, wherein the rack support 46 is in a fixed orientation relative to the rack arm 44, adjustment of the rack arm 44 can optionally align the rack support 46 with an elongate aperture 50 formed in a portion of the vehicle 10 that is to receive the rack support 46. In FIG. 1, the aperture 50 is formed in the front fender 22 and the side bed cap 29 on the driver's side of the vehicle 10. Thus, the orientation of the rack support 46 is pivoted about a longitudinal axis of the rack arm 44 approximately 90° in the direction of arrow 52 from the orientation in which the rack support 46 supports cargo. Pivotal adjustment of the rack support 46 can optionally span an arch in a plane in which the rack support 46 is located in the deployed state. The rack arm 44 can then be lowered relative to the vehicle 10 and at least partially, and optionally fully recessed within the interior space 38, with the rack support 46 and the rack arm 44 entering the interior space 38 through the aperture 50.

With the rack 14 in the stowed state, the rack arm 44 is adjusted to be mostly, and optionally fully recessed within the interior space 38 to be hidden from view by at least one body panel of the vehicle 10. The rack support 46 can also be at least partially, and optionally fully received within the interior space 38. To be hidden from view, the recessed portion of the rack arm 44 and/or the rack support 46 is not viewable by an observer viewing an exterior of the vehicle 10 from a distance. Although a portion of the frame assembly 40, or even a portion of the rack 14 may be viewed from beneath the vehicle or by looking down into the aperture 50 from above, the body panels of the vehicle 10 shield portions, and optionally an entirety of the rack 14 from view when the vehicle 10 is observed from the side. In other words, the vehicle 10 can appear as being devoid of the rack 14 while the rack 14 is in the deployed state 14.

Figure 2A:
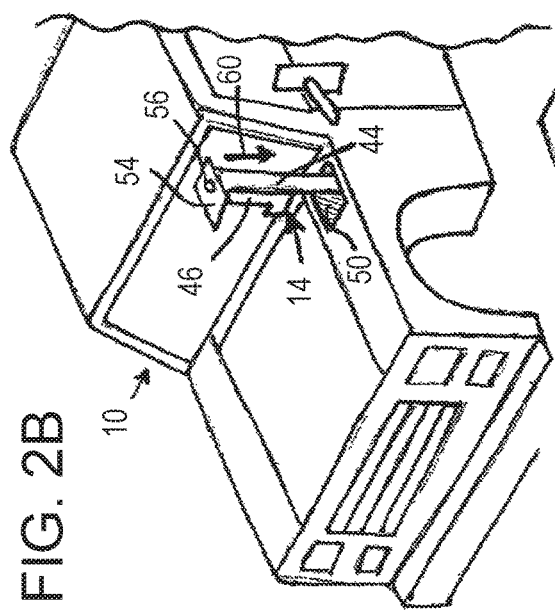
FIG. 2A is a perspective view of a front portion of the vehicle in FIG. 1 of a vehicle equipped with an embodiment of a cargo system comprising a forward concealable rack in a deployed state.
Figure 2B:
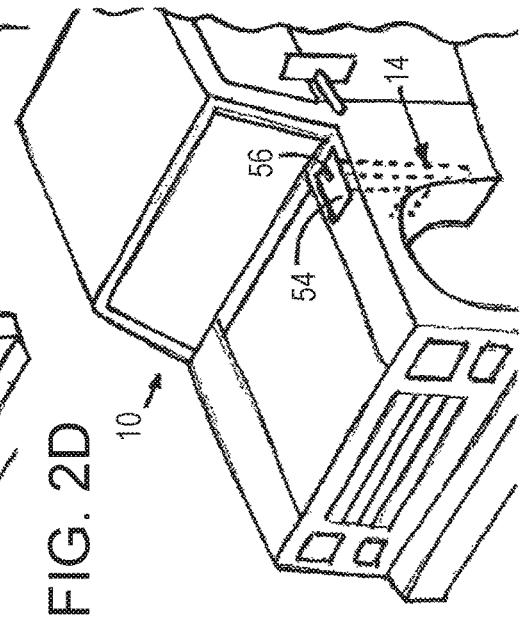
FIG. 2B is a perspective view of the front portion of the vehicle in FIG. 2A, with a rack support of the forward concealable rack adjusted in a vertical plane into a stowed orientation, in which the rack support is substantially parallel with the rack arm.
Figure 2C:
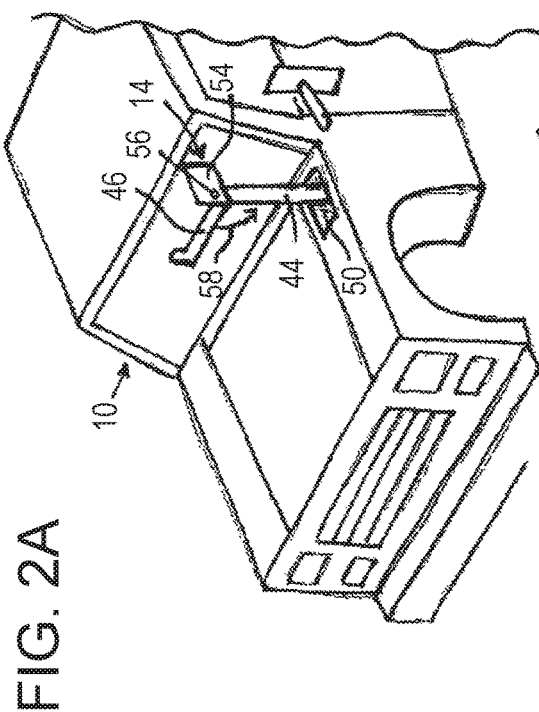
FIG. 2C is a perspective view of the front portion of the vehicle in FIG. 2B, with the rack arm partially stowed within a body of the vehicle.

FIGS. 2A-2D show an alternate embodiment of a rack 14 that includes a rack support 46 that is pivotally coupled to the rack arm 44, and includes a cover 54. Pivotal adjustment of the rack support 46 allows the aperture 50 through which the rack support 46 and rack arm 44 are recessed into the interior space to have a smaller footprint than the elongate embodiment of the aperture 50 described with reference to FIG. 1. The rack 14 is shown in the deployed state in FIG. 2A. To place the rack 14 in the stowed state shown in FIG. 2D, the rack support 46 is pivoted downward about a hinge 56, shown in broken lines in FIGS. 2A-2D, in the direction indicated by arrow 58. For example, the rack support 46 can be oriented substantially orthogonal (e.g., ±15°) to, or at another suitable angle relative to a longitudinal axis of the rack arm 44 in the deployed state. The rack support 46 is pivoted about the hinge 56 in the direction of arrow 58 such that a distal end of the rack support 46 travels along an arch in a plane of the rack arm 44, downwardly toward the vehicle 10, and approaches the rack arm 44. Fully adjusted, the rack support 46 can optionally abut against, or be arranged parallel with the rack arm 44 as shown in FIG. 2B. The rack arm 44, and the adjacent rack support 46 following pivotal adjustment about the hinge 56, can then be lowered relative to the vehicle 10 in the direction indicated by arrow 60 in FIGS. 2B and 2C, and at least partially, and optionally fully inserted into the interior space 38 through the aperture 50.

Figure 2D:
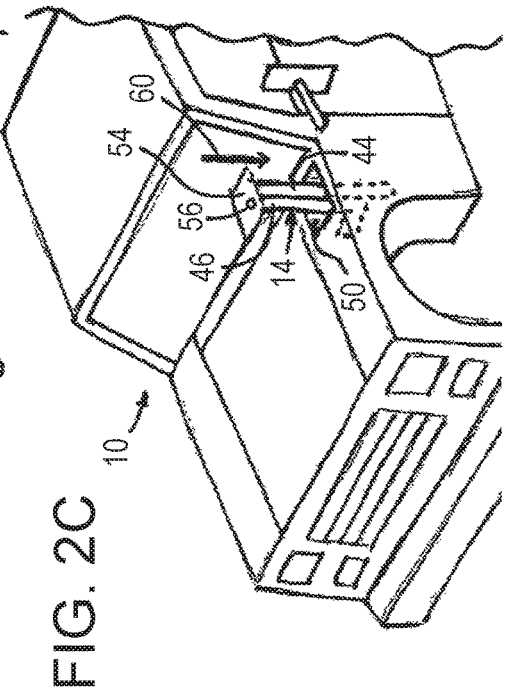
FIG. 2D is a perspective view of the front portion of the vehicle in FIG. 2C, with the rack arm fully stowed within the body of the vehicle.
Figure 3:
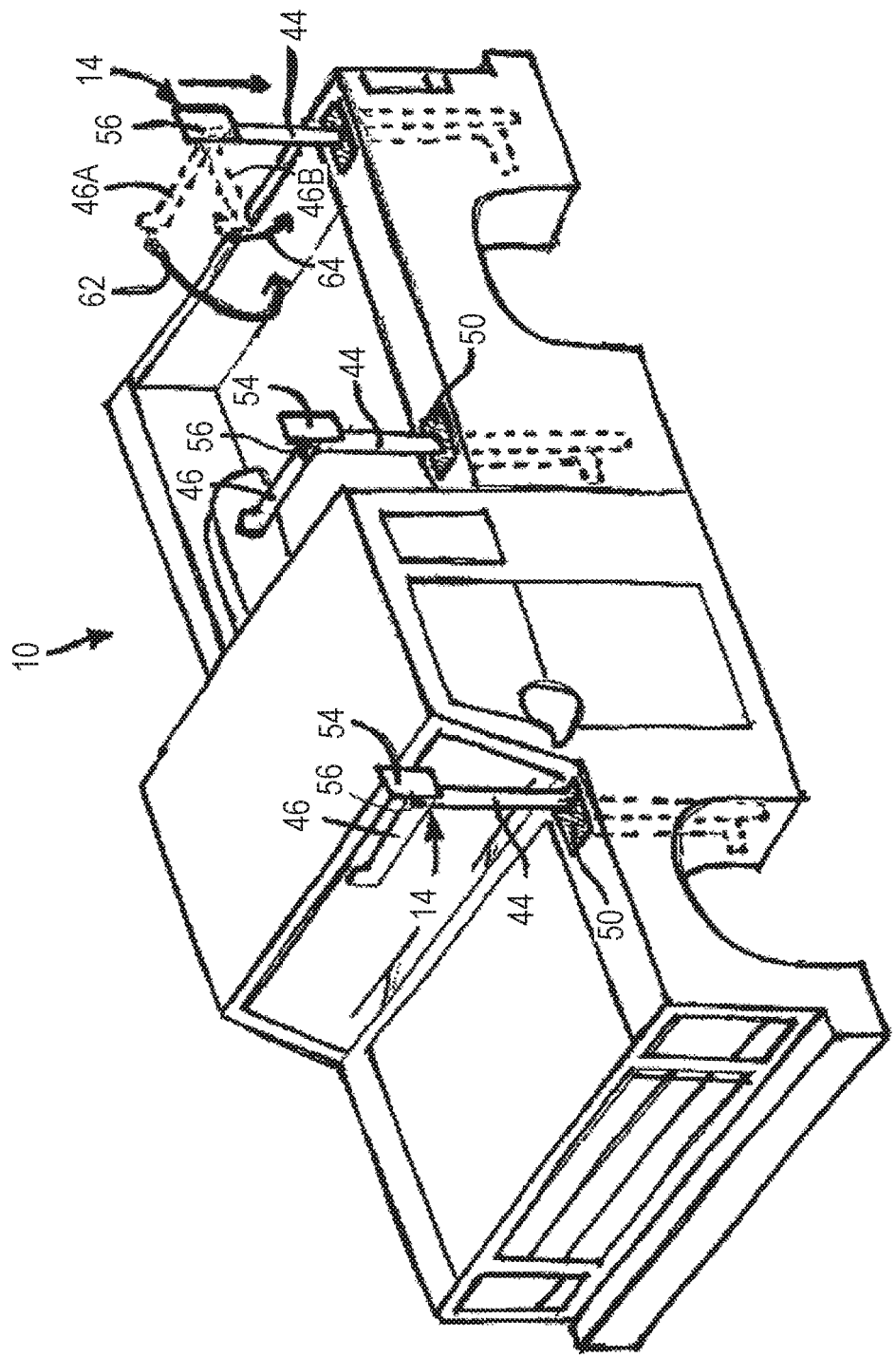
FIG. 3 is a perspective view of a vehicle equipped with an embodiment of a cargo system comprising a plurality of concealable racks.

The cover 54 can be coupled to the rack support 46 and/or the rack arm 44 to be adjusted to a plurality of positions as a result of the pivotal adjustment of the rack support 46 about the hinge 56. For example, with the rack support 46 positioned to support cargo while the rack 14 is in the deployed state, a major plane of the cover 54 can be vertically oriented, with an externally-exposed surface facing laterally outward, generally away from a driver's side of the vehicle 10 as shown in FIG. 2A. The externally-exposed surface includes the surface of the cover 54 that is exposed externally of the body of the vehicle 10 while the rack 14 is in the stowed state as described below. As a result of pivotally adjusting the rack support 46 to the orientation shown in FIG. 2B, the externally-exposed surface of the cover 54 can be adjusted so the major plane of the cover 54 is substantially horizontal. With the rack 14 in the stowed state, as shown in FIG. 2D, the rack arm is fully received within the interior space 38, and the cover 54 is positioned approximately flush with at least a portion of the body panel or other surface at least partially defining the aperture 50.

At least the externally-exposed surface of the cover 54 can be formed from the same material as, or from a different material from the neighboring body panel (e.g., fender, side bed cap 29 of truck bed, etc.) or other surface defining at least a portion of the aperture 50. The externally-exposed surface can be painted, molded, or otherwise provided with a color that matches, or at least closely resembles the neighboring body panel or other surface defining at least a portion of the aperture 50. The flush arrangement of the externally-exposed surface of the cover 54 relative to the neighboring body panel or other surface provides the body of the vehicle 10 with a continuous appearance, as if the rack 14 were absent, when the vehicle equipped with the rack 14 in the stowed state is viewed from afar.

FIGS. 3 and 4A-4D show other embodiments of the rack 14 installed on the vehicle 10. The embodiments of the rack 14 shown in FIGS. 3 and 4A-4D are similar to those in FIGS. 2A-2D, but the orientation of at least one rack support 46 is pivotally adjusted in at least two planes. For example, as shown in FIGS. 3 and 4A-4D, to adjust the rack 14 from the deployed state to the stowed state, the rack support 46 can be pivotally adjusted as follows:

(i) From a substantially horizontal orientation (shown in broken lines referred to as 46A in FIG. 3) in which the rack support supports cargo to another substantially horizontal orientation (shown in broken lines 46B in FIG. 3) that is approximately 90° about the rack arm 44 from the original horizontal orientation 46A. The rack support 46 moves in a direction (indicated at 62 in FIGS. 3 and 4A) spanning an arch in the horizontal plane in which the rack support 46 is located while the rack 14 is in the deployed state.

Figure 4A:
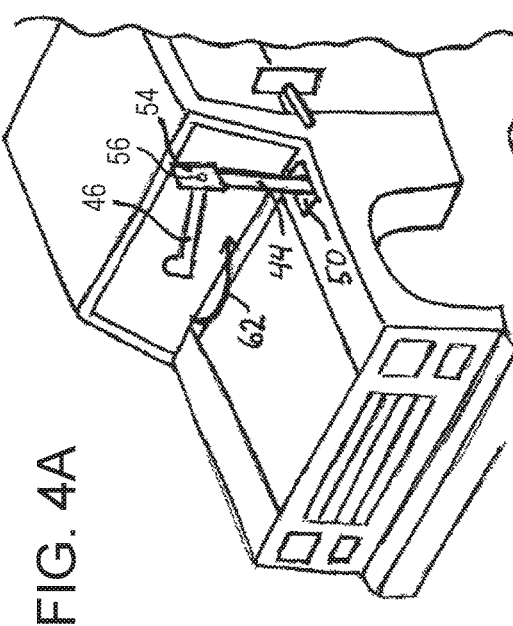
FIG. 4A is a perspective view of a front portion of the vehicle in FIG. 3 equipped with an embodiment of a cargo system comprising a forward concealable rack in a deployed state.
Figure 4B:
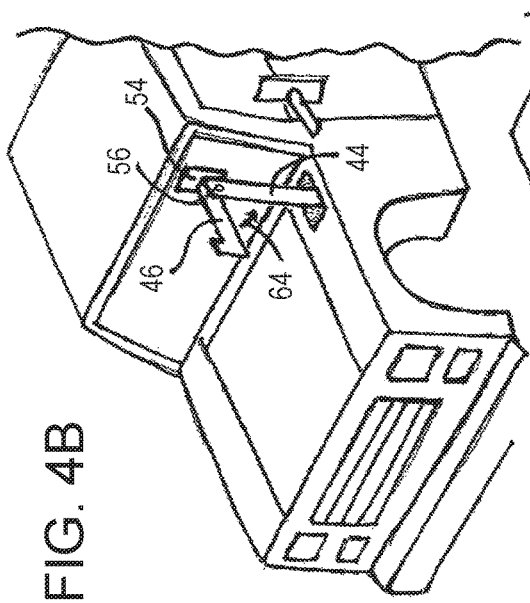
FIG. 4B is a perspective view of the front portion of the vehicle in FIG. 4A, with a rack support of the forward concealable rack adjusted in a horizontal plane relative to a rack arm, before being arranged in a stowed orientation.
Figure 4C:
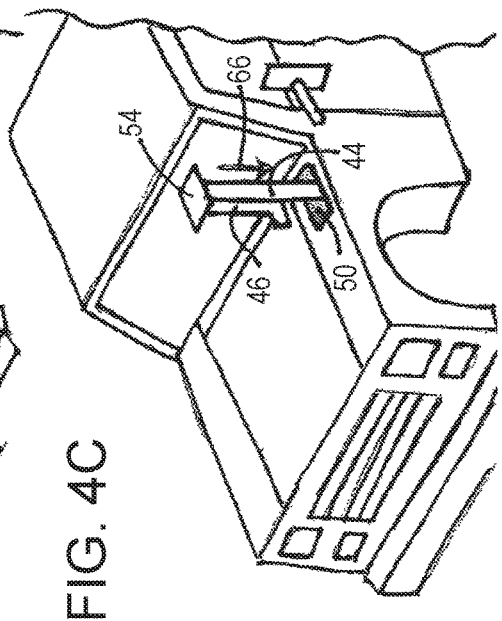
FIG. 4C is a perspective view of the vehicle in FIG. 4B, with the rack support adjusted in a vertical plane relative to the rack arm to a stowed orientation, in which the rack support is substantially parallel with the rack arm.
Figure 4D:
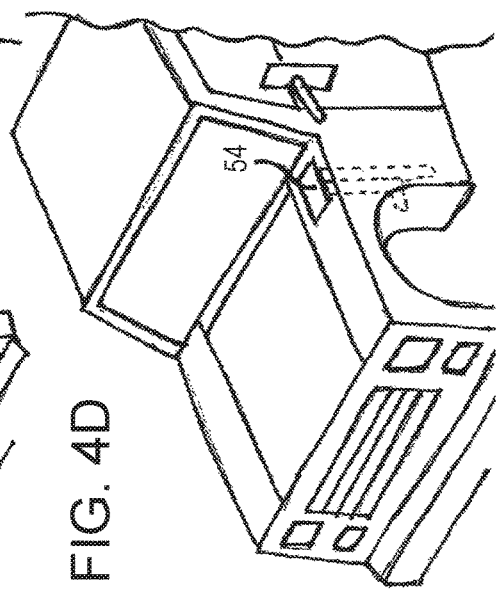
FIG. 4D is a perspective view of the vehicle in FIG. 4C, with the rack arm fully stowed within a body of the vehicle.

(ii) From the adjusted horizontal orientation 46B, the rack support 46 is pivoted about the hinge 56 in the direction of arrow 64 (FIGS. 3 and 4B) such that a distal end of the rack support 46 travels along an arch in a plane of the rack arm 44, downwardly toward the vehicle 10, and approaches the rack arm 44. Fully adjusted, the rack support 46 can optionally abut against, or be arranged parallel with the rack arm 44 as shown in FIG. 4C. The rack arm 44, and the adjacent rack support 46 that has been pivotally adjusted about the hinge 56, can then be lowered relative to the vehicle 10 in the direction indicated by arrow 66 in FIGS. 3 and 4C, and at least partially, and optionally fully inserted into the interior space 38 through the aperture 50. Again, the rack 14 in the stowed state can be provided with the cover 54 that provides the body of the vehicle 10 with a continuous appearance, as if the rack 14 were absent, when the vehicle equipped with the rack 14 in the stowed state is viewed from afar, as shown in FIG. 4D.

Figure 5A:
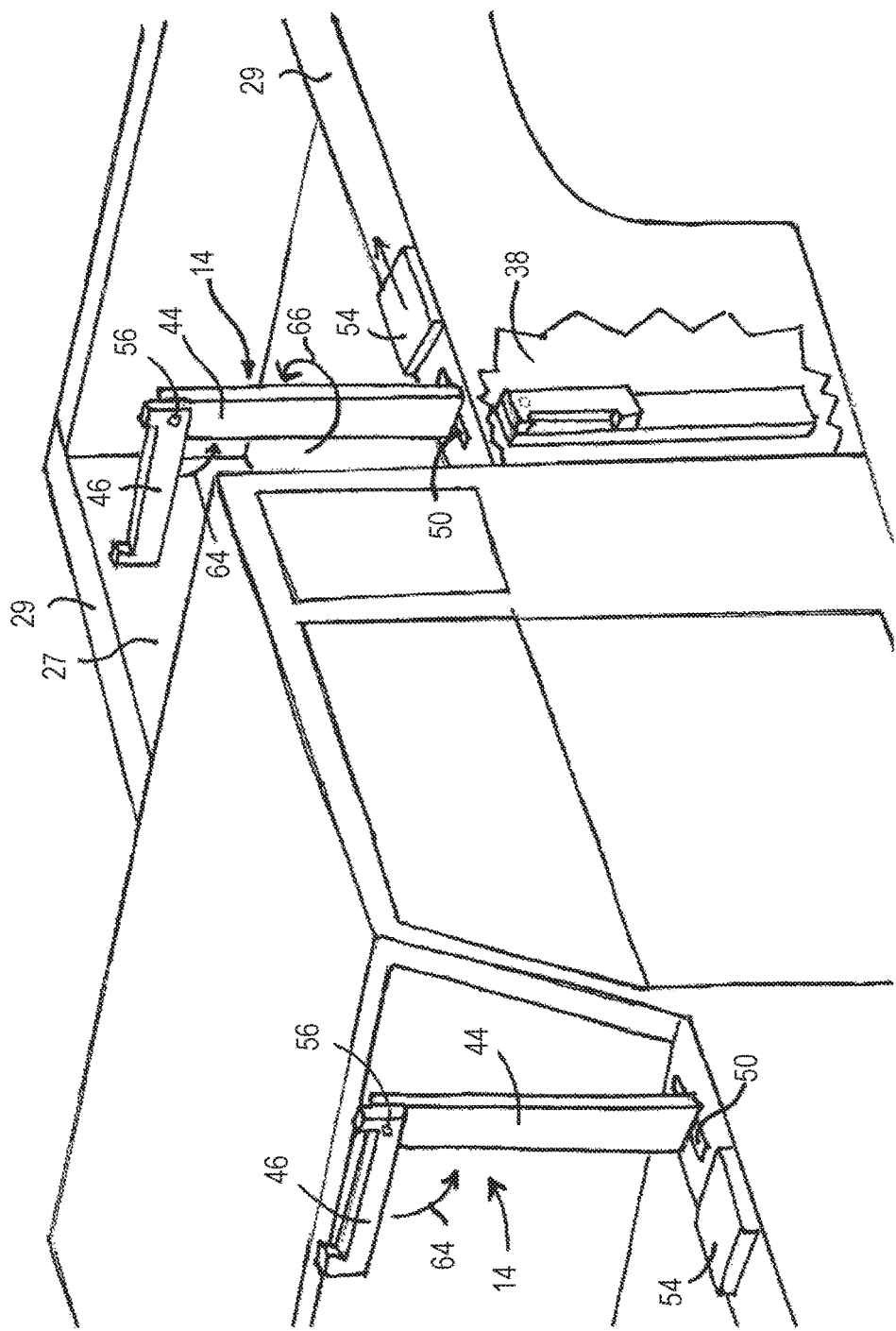
FIG. 5A is a perspective view of a vehicle equipped with an embodiment of a cargo system comprising a plurality of concealable racks, the plurality of concealable racks comprising a forward rack and a mid rack.
Figure 5B:
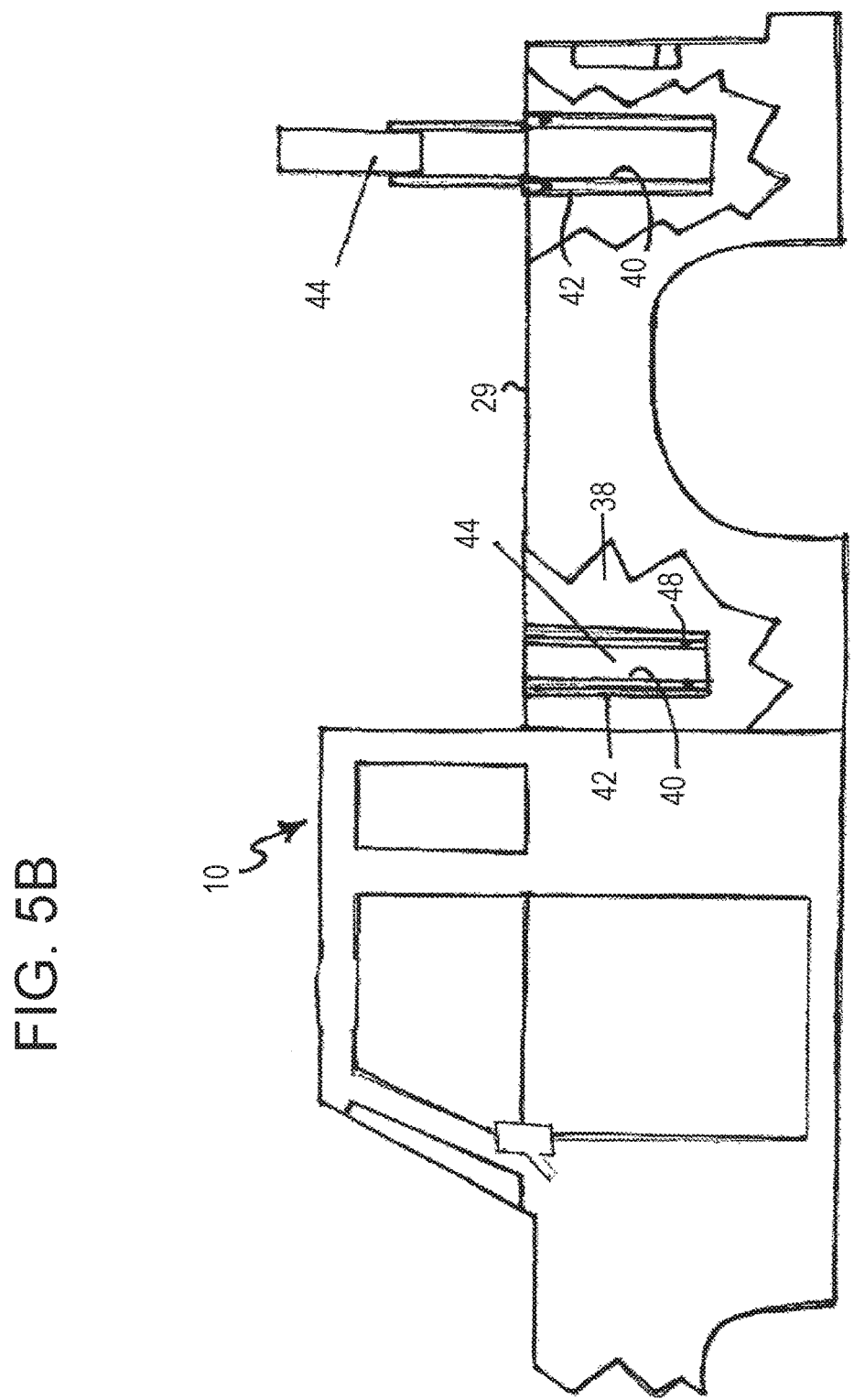
FIG. 5B is a side, partially cutaway view of a rear portion of the vehicle in FIG. 5A, with the mid rack in a stowed state and a rear rack in a partially stowed state.

FIGS. 5A-5C show additional embodiments of the rack 14 provided to a vehicle 10. According to the present embodiments, the rack 14 is configured to allow passage of a portion of the rack arm 44 through the aperture 50 in a first orientation, and to interfere with passage of the rack arm 44 through the aperture 50 in a second orientation. As shown in FIG. 5A, the rack arm 44 can have a rectangular cross-sectional shape having different length and width dimensions. The rack 14, in the deployed state as shown in FIGS. 5A and 5C, includes a rack arm 44 that extends across and beyond the aperture 50, to rest atop the side bed cap 29. The portions of the rail arm 44 that extend beyond the aperture 50 maintain the rack arm's deployed position above the side bed cap 29. To place the rack 14 in the stowed state, the rack support 46 is pivoted in a downward direction about the hinge 56 or other pivot point, generally toward the rack arm 44 in the direction of arrow 64 as described above. The rack arm 44 is pivoted approximately 90° in the direction indicated generally by arrow 66 to align the cross-sectional shape of the rack arm 44 with the aperture 50. At least a portion of the aligned rack arm can be inserted into the interior space 38 through the aperture 50.

Rather than being supported by a portion of the rack 14, the cover 54 of the embodiments shown in FIGS. 5A-5C is separately adjustable to cover the aperture 50 once the rack 14 has been returned to the stowed state. For example, the cover 54 can be a separate, standalone structure that is manually inserted, at least partially, into the aperture 50 to provide the body with the continuous appearance as described above. According to alternate embodiments, the cover 54 can be slidable, along a track provided to the side bed cap 29. Regardless of the configuration of the cover 54, the externally-exposed surface of the cover 54 can match, or closely resemble the finish of the neighboring body panel(s).

To return the rack 14 to the deployed state, the rail arm 44 can be at least partially retrieved from the interior space 38 through the aperture as shown in FIG. 5B. Once sufficiently retrieved, the rack arm 44 is pivoted about 90° to again cause the rack arm 44 to extend beyond the dimensions of the side bed cap 29.

Figure 6:
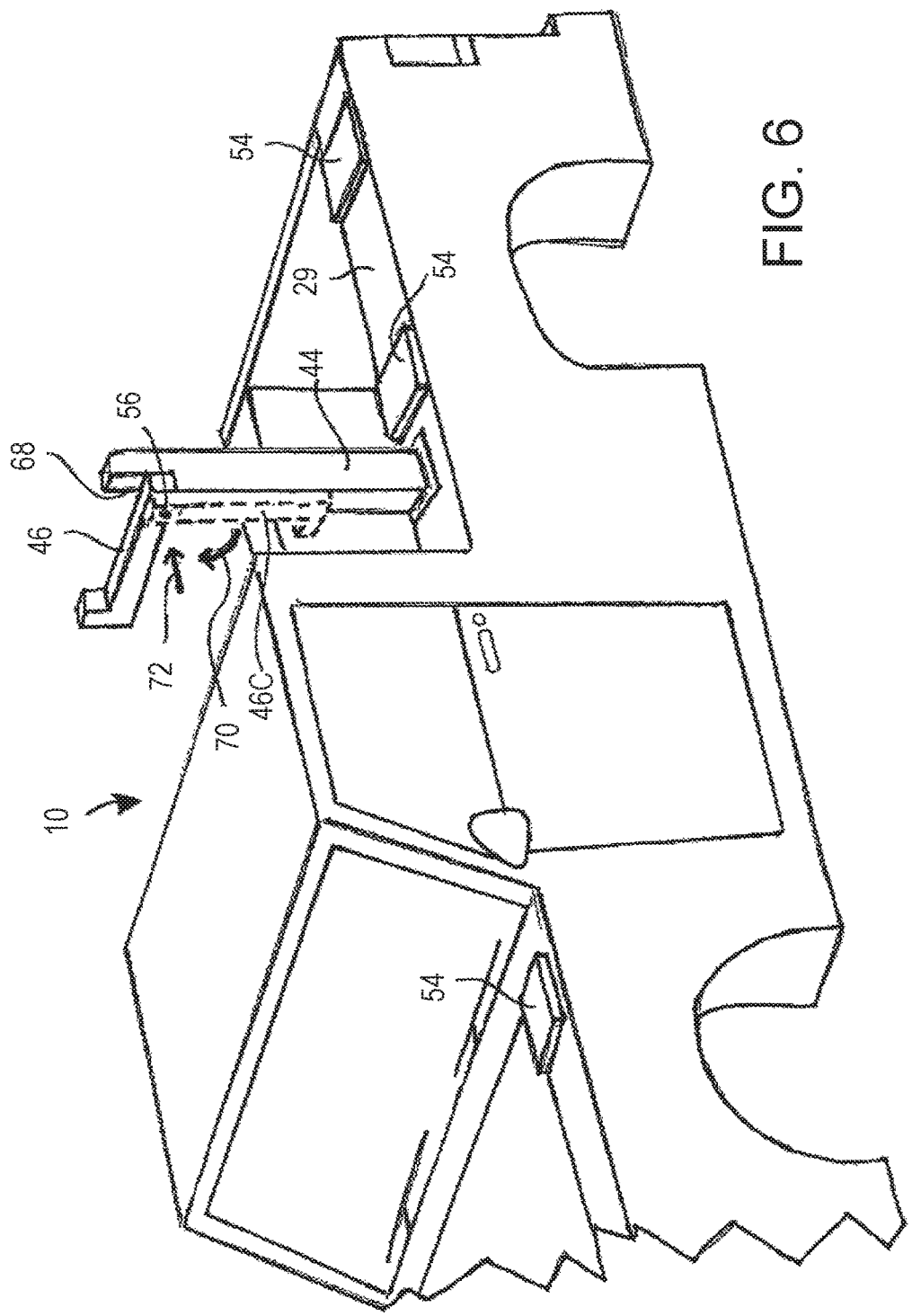
FIG. 6 is a perspective view of a vehicle equipped with an embodiment of a cargo system comprising a plurality of concealable racks, with a mid rack in a deployed state.

FIG. 6 shows other embodiments of the rack that include a rack arm 44 having a support notch 68. The rack arm 44 of the present embodiments is formed from square tubing, and is at least partially receivable within the interior space 38 as described herein. In the stowed state, the rack support 46 is arranged with a longitudinal axis thereof arranged parallel with a longitudinal axis of the rack arm 44. The arrangement of the rack support 46 for the rack 14 in the stowed state is shown in broken lines 46C in FIG. 6. To convert the rack 14 to the deployed state, the rack support 46 is pivoted upward about a hinge 56 in the direction indicated by arrow 70. Upon reaching a substantially-horizontal orientation, the rack support 46 is moved laterally, in the direction indicated by arrow 72, to be seated in the support notch 68. A bottom surface of the rack support 46 rests on a substantially-horizontal floor of the L-shaped support notch 68 to improve the stability and the load-capacity of the rack support 46 with the rack 14 in the deployed state.

Figure 7:
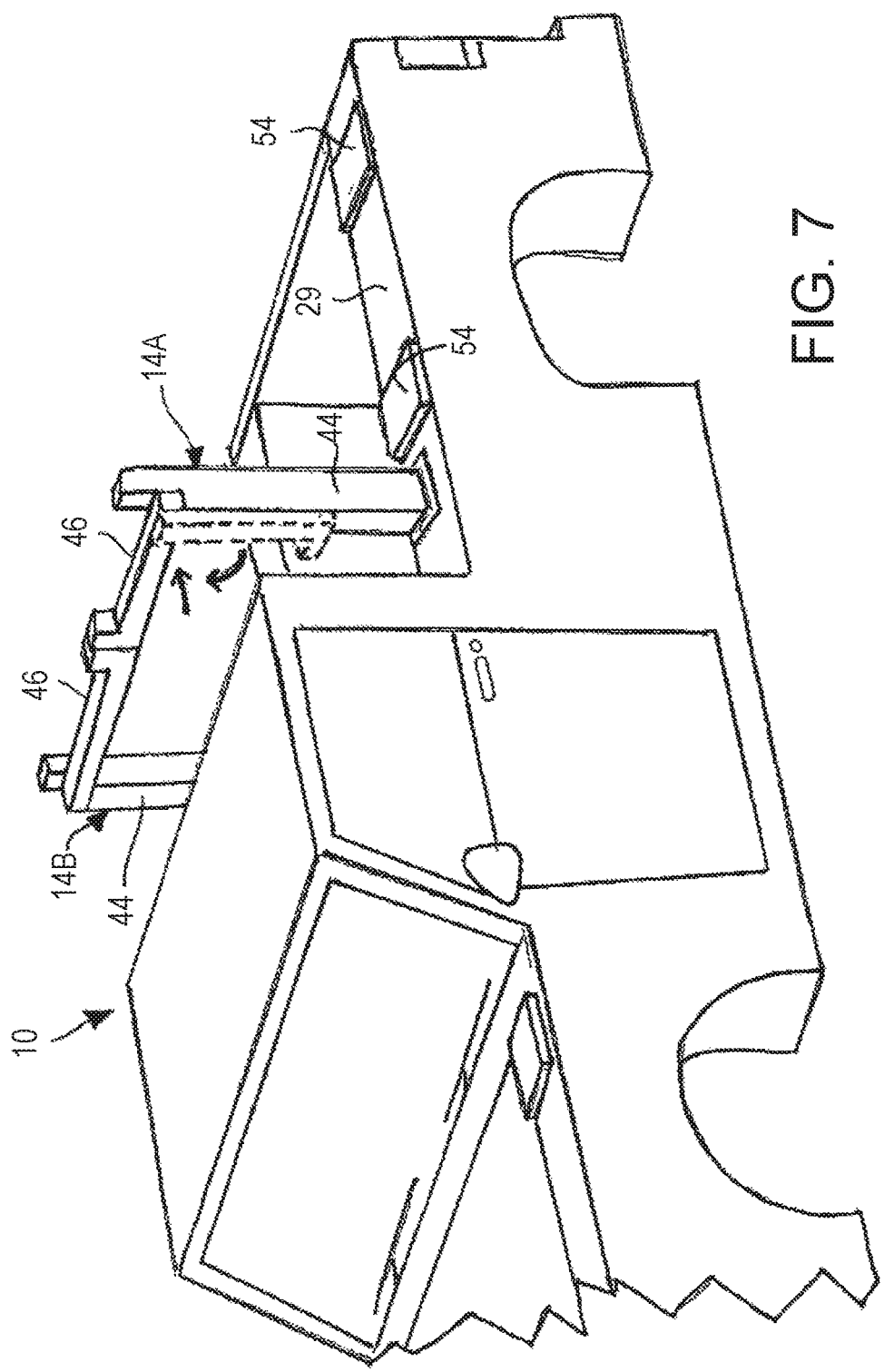
FIG. 7 is a perspective view of a vehicle equipped with an embodiment of a cargo system comprising a plurality of concealable racks, with opposing mid racks in a deployed state.

The embodiments described above include one or more racks 14 arranged along a driver's side of the vehicle 10. However, as noted above, one or more racks 14 can be arranged along the driver's side of the vehicle 10, along the passenger's side of the vehicle 10, or both the driver's side and the passenger's side of the vehicle 10. For example, opposing racks 14A, 14B can be arranged at similar locations along the axis 32 (FIG. 1), but on opposite lateral sides of the vehicle 10 as shown in FIG. 7. The rack support 46 of each rack 14A, 14B can be sufficient such that the rack support 46 provided to the racks 14A, 14B meet, or are closely arranged to each other at a location between the lateral sides of the vehicle 10. The opposing distal ends of the rack supports 46 can be coupled together for added support (e.g., a sleeve can extends over a portion of each opposing distal end of the rack supports 46), to enhance the load-carrying capacity of the racks 14A, 14B. Although the rack supports 46 described and shown herein include a distal flange 72 that extends upward adjacent to the distal end of the rack supports 46, embodiments of the rack support 46 can include a top, cargo contacting surface that is planar. Such embodiments can collectively form a planar surface spanning a width of the vehicle between the opposing racks 14A, 14B for carrying wide cargo such as 4 ft.×8 ft. sheets of plywood, for example.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A cargo system for supporting cargo on a vehicle, the cargo system comprising:
    a plurality of racks to be arranged at different positions along a length of the vehicle comprising, the racks comprising:
        (i) a frame assembly configured to cooperate with an internal structure of the vehicle,
        (ii) a rack arm that is adjustable relative to the frame assembly,
        (iii) a coupling system that couples the rack arm to the frame assembly in a plurality of positions that comprise: (a) a recessed position relative to a body panel of the vehicle, and (b) a deployed position extending vertically above the body panel of the vehicle for supporting the cargo vertically above a portion of the vehicle,
        (iv) a rack support that cooperates with the rack arm and is configured to support the cargo, and
        (v) a cap that covers a portion of the rack arm while the rack arm is in the recessed position.

2. The cargo system of claim 1, wherein the rack support is pivotally coupled to the rack arm by a hinge, and the rack support is pivotally adjustable about a pivot point established by the hinge between:
    a stowed orientation in which a portion of the rack support is positioned adjacent to the rack arm, and
    a deployed orientation in which the portion of the rack support extends generally away from the rack arm.

3. The cargo system of claim 1, wherein the frame member is configured to cooperate with the internal structure of the vehicle at a location that is concealed by a body panel of the vehicle when an exterior of the vehicle is observed.

4. The cargo system of claim 1 further comprising a lock that maintains the support arm in the deployed position relative to the frame member.

5. The cargo system of claim 1 further comprising a lock that maintains the support arm in the recessed position relative to the frame member.

6. The cargo system of claim 1, wherein the frame assembly of the racks is configured to cooperate with a plurality of different internal structures arranged apart from each other along a lengthwise direction of the vehicle.

7. The cargo system of claim 1, wherein at least one of the rack supports is pivotal in a horizontal plane at an elevation vertically above a portion of the vehicle, the rack support being adjustable between:
    a first orientation substantially parallel with a lengthwise direction of the vehicle, and
    a second orientation substantially perpendicular to the lengthwise direction of the vehicle.

8. The cargo system of claim 1, wherein the coupling system comprises a portion of the rack arm having a shape that passes through an aperture in a body panel of the vehicle in a first orientation and does not pass through the aperture in the body panel of the vehicle in a second orientation.

9. A cargo system for supporting cargo on a vehicle, the cargo system comprising:
    a plurality of racks to be arranged at different positions along a length of the vehicle comprising, the racks comprising:
        (i) a frame assembly configured to cooperate with an internal structure of the vehicle,
        (ii) a rack arm that is adjustable relative to the frame assembly,
        (iii) a coupling system that couples the rack arm to the frame assembly in a plurality of positions that comprise: (a) a recessed position relative to a body panel of the vehicle, and (b) a deployed position extending vertically above the body panel of the vehicle for supporting the cargo vertically above a portion of the vehicle,
        (iv) a rack support that cooperates with the rack arm and is configured to support the cargo, and
        (v) a shield arranged adjacent to a region of the rack arm to at least partially close an aperture in the body panel while the rack arm is in the deployed position.

10. A vehicle comprising:
    a set of ground-engaging wheels;
    a body formed from a plurality of body panels, the body having a length extending in a longitudinal direction parallel with a driving direction of the vehicle and a width extending transversely to the longitudinal direction; and
    a cargo system for supporting cargo on the vehicle, the cargo system comprising:
        at least a first rack and a second rack arranged at different positions along the length of the vehicle, the first and second racks each comprising:
            (i) a frame assembly coupled to an internal structure of the vehicle,
            (ii) a rack arm adjustably coupled to the frame assembly by a coupling system, wherein the coupling system couples the rack arm to the frame assembly in a plurality of positions that comprise: a recessed position relative to at least one of the body panels of the vehicle, and a deployed position where the rack arm extends vertically above the at least one of the body panels of the vehicle for supporting the cargo vertically above a portion of the vehicle, and (iii) a rack support that is coupled to the rack arm and is configured to support the cargo, wherein at least one of the first and second racks further comprises a cap that covers a portion of a respective rack arm of the at least one of the first and second racks while the respective rack arm is in the recessed position.

11. The vehicle of claim 10, wherein the rack support of at least one of the first and second racks is pivotally coupled to the rack arm by a hinge, and the rack support pivots about a pivot point established by the hinge between:

a stowed orientation in which a portion of the rack support is positioned adjacent to the rack arm, and a deployed orientation in which the portion of the rack support extends generally away from the rack arm.

12. The vehicle of claim 10, wherein the frame member of each rack cooperates with the internal structure of the vehicle at a location that is concealed by at least one of the body panels of the vehicle when an exterior of the vehicle is observed.

13. The vehicle of claim 10, wherein at least one of the first and second racks further comprises a lock that maintains the support arm in the deployed position relative to the frame member.

14. The vehicle of claim 10, wherein at least one of the first and second racks further comprises a lock that maintains the support arm in the recessed position relative to the frame member.

15. The vehicle of claim 10, wherein the frame assembly of each of the first and second racks is configured to cooperate with a different internal structure arranged along the length of the vehicle.

16. The vehicle of claim 10, wherein the rack support of at least one of the first and second racks is pivotal in a horizontal plane at an elevation vertically above a portion of the vehicle, the rack support being adjustable between:

a first orientation substantially parallel with a lengthwise direction of the vehicle, and a second orientation substantially perpendicular with a widthwise direction of the vehicle.

17. The vehicle of claim 10, wherein the coupling system of at least one of the first and second racks comprises a portion of the rack arm having a shape that passes through an aperture in a body panel of the vehicle in a first orientation and does not pass through the aperture in the body panel of the vehicle in a second orientation.

18. A vehicle comprising:

a set of ground-engaging wheels;

a body formed from a plurality of body panels, the body having a length extending in a longitudinal direction parallel with a driving direction of the vehicle and a width extending transversely to the longitudinal direction; and a cargo system for supporting cargo on the vehicle, the cargo system comprising:

at least a first rack and a second rack arranged at different positions along the length of the vehicle, the first and second racks each comprising:

(i) a frame assembly coupled to an internal structure of the vehicle, (ii) a rack arm adjustably coupled to the frame assembly by a coupling system, wherein the coupling system couples the rack arm to the frame assembly in a plurality of positions that comprise: a recessed position relative to at least one of the body panels of the vehicle, and a deployed position where the rack arm extends vertically above the at least one of the body panels of the vehicle for supporting the cargo vertically above a portion of the vehicle, and (iii) a rack support that is coupled to the rack arm and is configured to support the cargo, wherein at least one of the first and second racks further comprises a shield arranged adjacent to a region of a respective rack arm of the at least one of the first and second racks to at least partially close an aperture in the body panel while the respective rack arm is in the deployed position.

\* \* \* \* \*